Aug. 28, 1956 — R. BINDER — 2,760,360
AUTOMOBILE CLUTCH
Filed Aug. 12, 1952
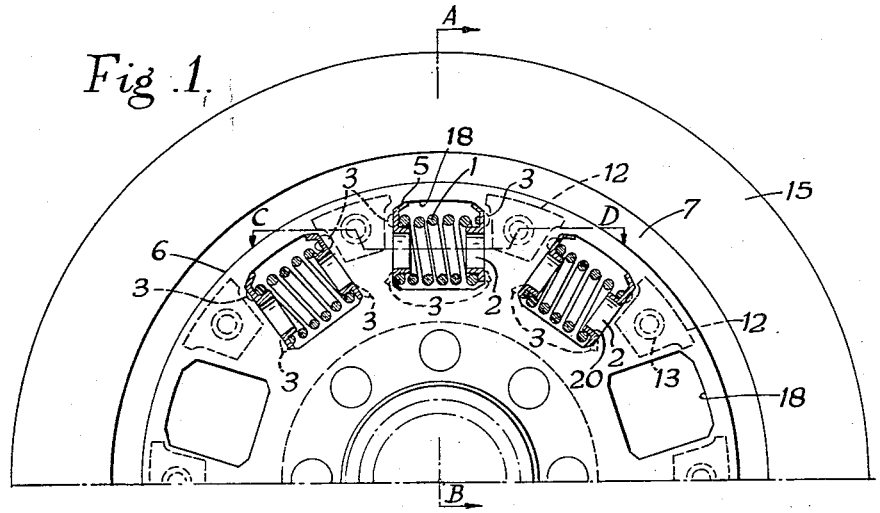
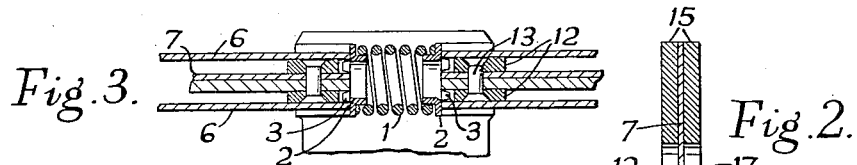
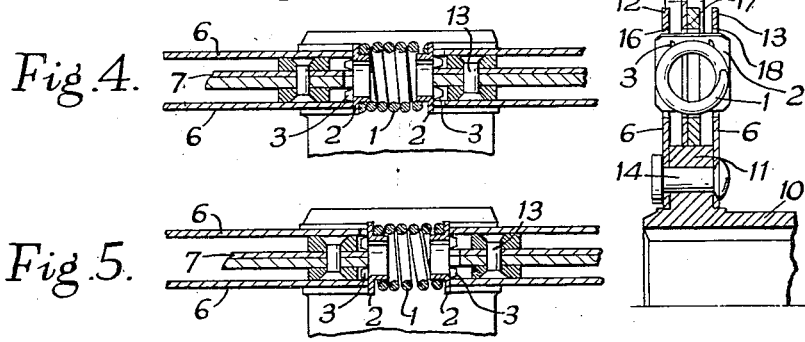
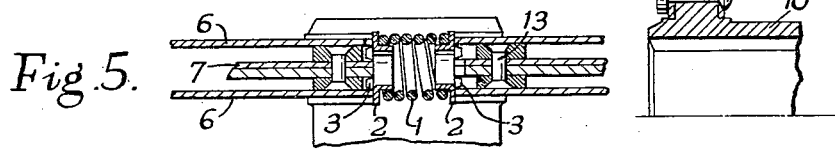
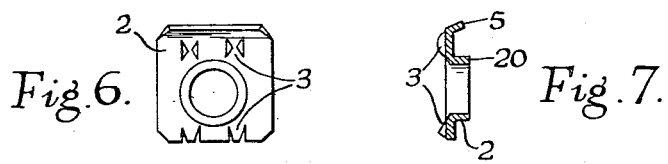 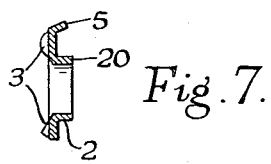
 
INVENTOR:
Richard Binder
BY: Michael S. Striker
agt.

United States Patent Office

2,760,360
Patented Aug. 28, 1956

2,760,360

AUTOMOBILE CLUTCH

Richard Binder, Schweinfurt (Main), Germany, assignor to Fichtel & Sachs A.-G., Schweinfurt (Main), Germany, a German body corporate Application August 12, 1952, Serial No. 303,927

Claims priority, application Germany December 5, 1951

2 Claims. (Cl. 64—27)

This invention relates to vibration dampers especially for automobile clutches, and more particularly to the spring guide elements of such dampers.

With known guides for the springs of vibration dampers in automobile clutches, the spring either bears against the edges of the spring apertures or the spring ends are held in guide elements which are guided on the edges of the spring apertures and are intended to prevent contact between the springs and the edges of the spring apertures. In both constructions, considerable friction is set up in the continuous oscillatory movements of the clutch discs, in the former case between the springs and the spring apertures and in the second case between the guide elements and the spring apertures. Thus, in the known construction, wear always occurs which, as experience shows, may lead to damage to the torsion springs and the guide elements.

The object of the invention is to produce a guide element for the springs, with which no friction, or only very slight friction, occurs during the movement of the clutch discs in relation to one another.

According to the invention the guide element, which is constructed in the form of a plate, has on its surface opposite to its spring-engaging surface, projections which effect the lateral guiding of the plate on at least one of the inner and outer clutch discs. These projections may be provided with surfaces parallel or inclined in relation to the centre line of the clutch discs. The projections are stamped out of the material of the plate.

A constructional form of the invention is illustrated by way of example in the accompanying diagrammatic drawings wherein:

Figure 1 is a half elevation of an automobile clutch made in accordance with the invention, certain parts however being shown in section;

Figure 2 is a section through the guide discs and the driving disc on the section line A—B on Figure 1;

Figures 3, 4, and 5 are a section through the guide discs and the driving disc on the section line C—D on Figure 1;

Figures 6, 7, and 8 are three views of the guide plate on a larger scale; and

Figure 9 shows a modification.

The clutch comprises a hub 10 having an annular flange 11 on opposite sides of which a pair of guide discs 6 are fixed by rivets 14 so as to be spaced apart. An inner disc or spinner plate 7 is disposed between the discs 6 and mounted displaceably on the flange 11, and carrying the usual friction linings 15 and also carrying spacer blocks 12 attached by rivets 13. The discs and spinner plate have a series of sets of aligned openings 16, 17, 18 each set containing a helical spring 1. In each set of openings also a pair of spring guide plates 2 engage opposite ends of the spring. Each plate 2 is stamped integrally from a piece of metal and on its spring-engaging side has a central annular projection 20 to engage in the end of the spring and on its opposite side has radially inner and outer pairs of projections 3 which engage in the spaces between the spinner plate and the discs 6. The projections extend generally in the direction of the plane of the spinner plate and may be pinched out of the metal of the guide plate without penetrating the edge of said plate as shown at the upper parts of Figures 6 and 7 or may penetrate the adjacent edge as shown at the lower parts of those figures.

Shoulders 5 are provided on the guide plates to take up the centrifugal force of the plate 2.

Figure 3 shows the guide discs 6 opposite the driving disc (or spinner plate) 7 in its central position.

Figure 4 shows the guide discs 6 opposite the driving disc 7 in the outermost right-hand position.

Figure 5 shows the guide discs 6 opposite the driving disc 7 in its outermost left-hand position.

It will be seen that in the positions of Figures 4 and 5 one guide plate 2 is in each case held solely by the driving disc 7 and does not come into contact with the guide discs 6, while the other guide plate 2 is held by the guide discs 6 and does not come into contact with the driving disc 7. Friction between the projections 3 on the plate 2 and the guide discs 6 or the driving disc 7 can therefore only occur within the first part of the relative rotational movement of said discs and spinner plate from the midposition shown in Figure 3, until the projections 3 have left the bearing faces of the guide discs 6 or of the driving disc 7. If the projections 3 on the guide plates 2 have their side faces parallel to the centre plane of the guide discs 6 and driving disc 7, over the greater part of the relative travel of the discs and spinner plate from the midposition no sliding contact at all takes place with said projections. The sliding contact within the first small part of the relative travel of the discs and spinner plate can also be completely avoided if the projections 3 of the guide plate 2 are somewhat bevelled on both sides, as illustrated in Figures 3–5 and 8.

Friction between the spring apertures and the springs and also between the guide plates and the guide discs and the driving disc is prevented by the novel construction of the spring guide plates. There is therefore no wear either on the spring guide plates or on the springs.

The construction is not limited to the constructional example. The spring guide plates are also applicable to clutches in which a guide disc is constructed as a driving disc.

I claim:

1. In a clutch, in combination, a hub; a pair of spaced outer discs fixed coaxially to said hub; an inner disc freely turnable on said hub and located between and spaced from said outer discs to define a pair of gaps therewith, all of said discs respectively being formed with aligned openings located between said hub and the outer peripheries of said discs, respectively; a coil spring located in said openings with opposite ends of said coil spring respectively located adjacent opposite ends of each opening and on opposite sides of a plane including the axis of said hub; and a pair of plates respectively engaging all of said discs and respectively engaging opposite ends of said spring and located between the latter and said discs, each plate having a central tubular portion extending from said plate into said coil spring, and each plate having a pair of end portions one of which is nearer to said hub than the other, said one end portion having a pair of plate portions extending into said gaps, respectively, and said other end portion having inwardly from the extremity thereof a pair of plate portions extending respectively into said gaps.

2. For use in a clutch, a spring guiding plate consisting of a single piece of sheet metal having a substantially flat annular portion forming an outwardly extending flange of a substantially central tubular portion of said plate which is adapted to extend into an end of a coil spring, said plate having one pair of plate portions on one side of said tubular portion thereof extending from said flange in a direction opposite to said tubular portion and said plate having on a side thereof opposite from said one side another pair of plate portions extending from said flange in a direction opposite to said tubular portion of said plate.

References Cited in the file of this patent

UNITED STATES PATENTS

| | | |
|---|---|---|
| 1,952,892 | Reed | Mar. 27, 1934 |
| 1,967,344 | Worner | July 24, 1934 |
| 2,321,941 | Rose | June 15, 1943 |
| 2,437,537 | Kelleher | Mar. 9, 1948 |

FOREIGN PATENTS

| | | |
|---|---|---|
| 216,565 | Switzerland | 1941 |